INVENTOR.
Horst Ernst Schuchardt

United States Patent Office 3,292,388
Patented Dec. 20, 1966

3,292,388
RADIANT HEATING OR COOLING SYSTEMS
Horst Ernst Schuchardt, Zollikofen, near Bern, Switzerland, assignor to Frenger International Corporation, Bern, Switzerland, a corporation of Switzerland
Filed Feb. 25, 1965, Ser. No. 435,296
Claims priority, application Germany, Mar. 5, 1964, F 42,215
7 Claims. (Cl. 62—324)

This invention relates to radiant heating and cooling sub-ceilings comprising a system of pipes adapted to be heated or cooled by means of a heat exchange fluid flowing through said pipes and a plurality of plate elements arranged in heat exchange relationship to said pipes so as to form a radiant heating or cooling panel.

In sub-ceilings of this kind, the plate elements are preferably made of metal sheet such as aluminum or another metal of high thermal conductivity and are heat conductively and detachably associated with the pipes.

One object of the invention is to provide a sub-ceiling adapted to form part of an air conditioning system comprising means for selectively heating or cooling the heat exchange fluid flowing through the pipes and for supplying ventilation air to a room subjacent the sub-ceiling.

Another object is to provide an air conditioning system comprising a radiant heating or cooling sub-ceiling in combination with a compartment or chamber incorporating a heat pump system and ventilation channels adapted to supply the calories required for heating or cooling the fluid flowing through the pipes by means of heat exchangers arranged in heat exchange relation with an air flow derived from the atmosphere so as to eliminate or substantially reduce the requirement for fuel supply, pipe lines and ventilation ducts.

A further object is to supply an air conditioning system which can readily be combined with means for acoustic damping of the room to be air-conditioned.

Other and ancillary objects will appear from the following description with reference to the drawings in which.

Figure 1:
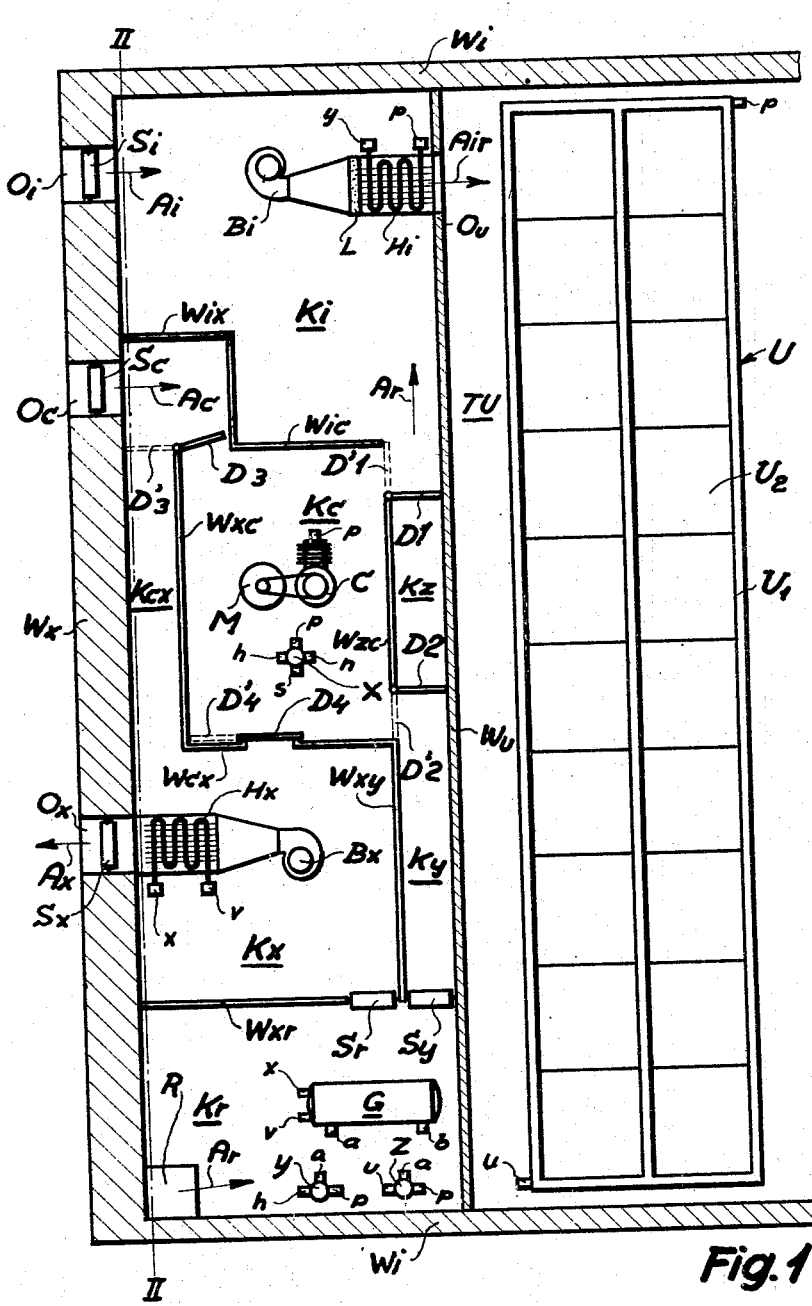
FIG. 1 is a plan view of a room provided with an air conditioning system according to the invention.
Figure 2:
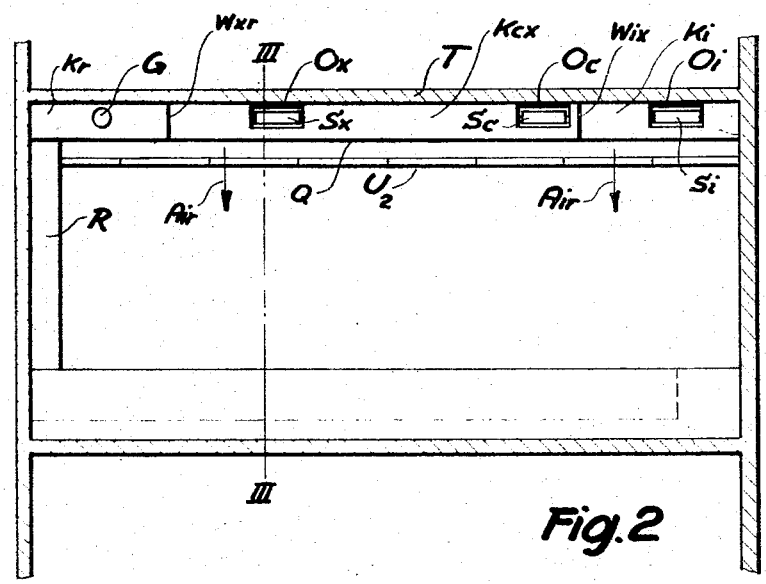
FIG. 2 is a vertical section at a reduced scale taken along the lines II—II in FIG. 1.
Figure 3:
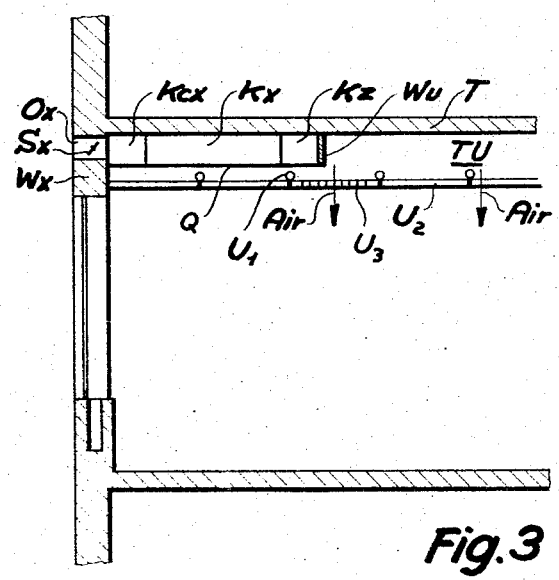
FIG. 3 is likewise a vertical section at a reduced scale taken along the lines III—III in FIG. 2.

Referring to the drawings, and more particularly to FIGS. 1, 2, and 3, a room comprising an air-conditioning sub-ceiling according to the invention is defined by an outer wall W$x$, inner walls W$i$ and a ceiling T in which a sub-ceiling U is suspended as illustrated in FIGS. 2 and 3.

The sub-ceiling U, FIG. 1, comprises a pipe frame U1 and a plurality of plate elements U2, heat conductively associated with the pipes of the frame U1. A partition wall W$u$, as shown in FIG. 1, separates the part of the room in which the sub-ceiling is suspended from the remaining part of the room, shown to the left of FIG. 1, which constitutes a compartment defined by the outer wall W$x$, inner walls W$i$, wall W$u$, the ceiling T and a base plate Q, FIG. 2. This compartment, comprising the machinery pertaining to the heat pump system including compressor, heat exchangers and ventilation components, is subdivided into the following chambers:

Air-intake chamber K$i$, defined by walls W$x$, W$i$, W$u$, W$ix$, W$ic$,

Compressor chamber K$c$, defined by walls W$ic$, W$xc$, W$cx$, W$zc$,

An air expulsion chamber K$x$, defined by walls W$cx$, W$xy$, W$xr$ and outer wall W$x$, A room air chamber K$r$, defined by walls W$x$, W$xr$, W$u$ and W$i$.

Moreover, the machinery compartment comprises air connection channels K$cx$, K$y$ and K$z$. The chambers thus defined comprise the following components:

K$i$: A blower B$i$, an air filter L, an air-to-fluid heat exchanger H$i$. An aperture O$i$ is provided in the outer wall W$x$ and an aperture O$u$ is provided in the wall W$u$ connecting the chamber K$i$ with the space TU intermediate the ceiling T and the sub-ceiling U.

K$c$: A compressor unit comprising a compressor C and driving motor M. This chamber may also comprise auxiliary machinery such as pumps, etc.

K$x$: A blower B$x$ and an air-to-fluid heat exchanger H$x$, arranged adjacent an opening O$x$ in the outer wall W$x$.

K$r$: A fluid-to-fluid heat exchanger G. This chamber further comprises an opening in the bottom plate Q connecting the chamber K$r$ with an air duct R as shown in FIG. 2 for recirculation of the room air.

The walls defining these chambers further comprise the following devices for regulating the air circulation:

Air valves comprising dampers or obturators D1, D'1, D2 and D'2 in the wall WZC and D3 and D'3 in the wall W$ic$. Moreover, a similar air valve D4, D'4 is provided in the wall W$cx$.

Adjustable air valves S$r$ and S$y$ are provided in the wall W$xr$ for regulating the air flow to the channel K$y$ and between the chambers K$x$ and K$r$.

Figure 4:
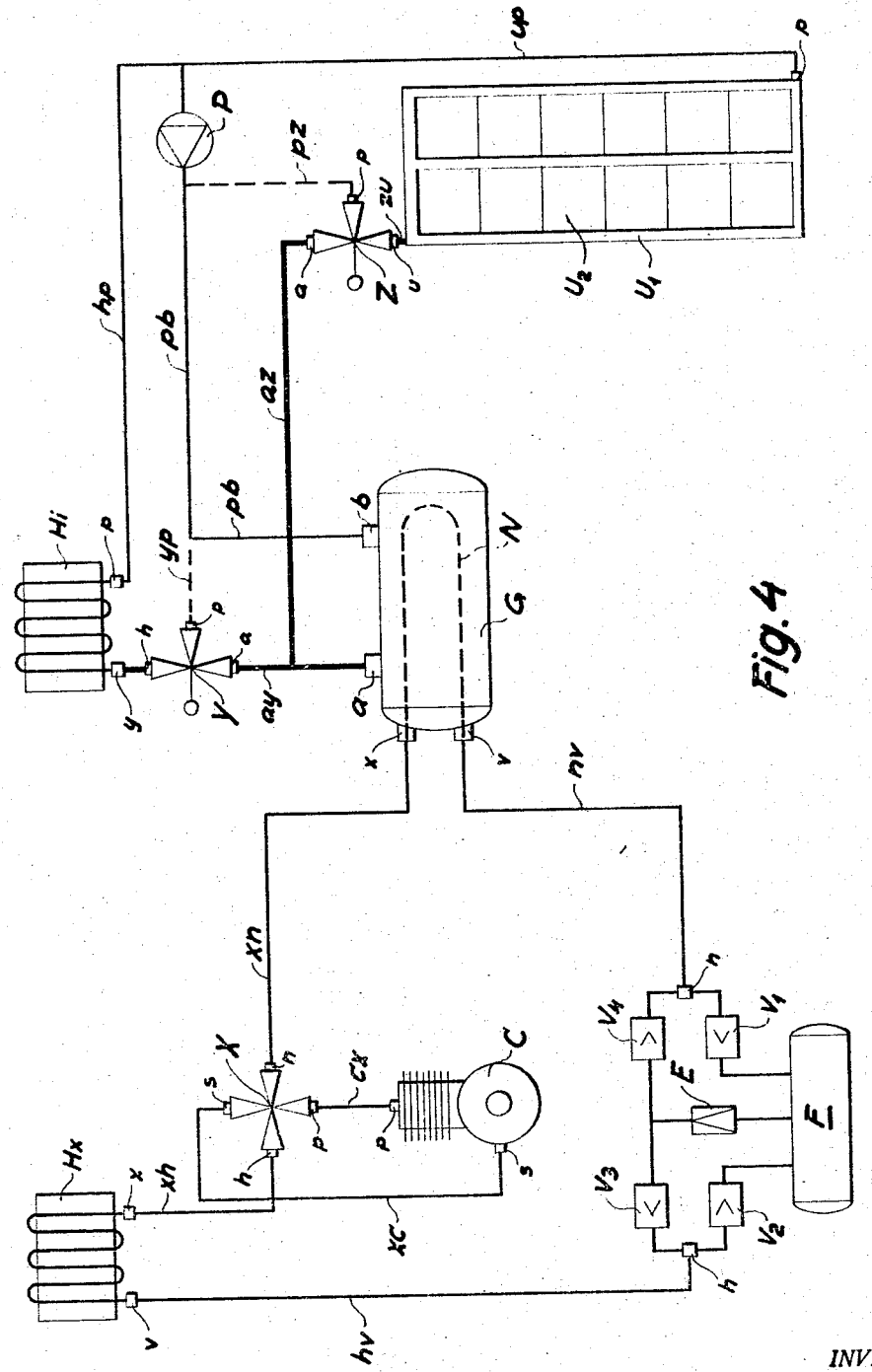
FIG. 4 is a diagrammatic view of the combined sub-ceiling and heat pump system.

The connections between the heat pump components and the pipe frame pertaining to the sub-ceiling and the circuits formed by these connections will be explained with reference to FIG. 4:

The pressure side of the compressor C is connected with a reversing valve X through a conduit $cx$ and one branch of the reversing valve X is connected with the low pressure side of the compressor C through the conduit $xc$. Another branch of the reversing valve X is connected with the primary circuit N of the fluid-to-fluid heat exchanger G through the conduit $xn$. The primary circuit N is furthermore connected with a pair of uni-directional valves V1 and V4 through a conduit $nv$, and the air-to-fluid heat exchanger H$x$ is similarly connected with uni-directional valves V2 and V3. The valves V1 and V2 are connected with a container F for collecting the condensed fluid flowing through the primary circuit N, and an expansion valve E is inserted between the container F and the pipe connecting valves V3 and V4.

The components C, X, E, F, H$x$ and N constitute a heat pump system for circulating a heat exchange fluid (hereinafter referred to as the primary fluid) such as freon or the like.

The secondary circuit of the fluid-to-fluid heat exchanger G is divided into two circuits both of which are connected to the terminals $a$ and $b$ of the heat exchanger G.

One of these circuits comprises the air-to-fluid heat exchanger H$i$ and a by-pass valve Y; the other circuit comprises the pipe frame U1 of the sub-ceiling and a by-pass valve Z. A circulation pump P is associated with both of these circuits.

The terminals or connecting points of the components inserted in the heat pump system are designated by small letters corresponding to the capital letters designating the components with which they are connected through the pipe lines each of which is designated by two small letters indicating the terminals which are interconnected by the pipe lines. The small letters designating the terminals of the components also appear in FIG. 1 showing the arrangement of the heat pump components within the compartment defined by the inner walls, the outer wall and the partition wall W$u$, but the pipes interconnecting the components have been omitted in this figure for the sake of clarity. In FIG. 4 the thick lines $a$–$y$, $h$–$y$ and $a$–$z$ indicate the connecting pipes through which the secondary fluid is flowing in the positive direction from G$a$ to G$b$, whereas the thin lines $h$–$p$, $p$–$b$ and $u$–$p$ indicate the return lines from the components towards the terminal G$b$.

The operation of the heat pump system will now be explained with reference to FIGS. 1 and 4:

A. HEATING

The compressor circuit (primary circuit)

When operating on the heating cycle, the heating of the pipe frame U1 and of the fresh air A$i$ entering through the opening O$i$ is effected in the following manner:

The reversing valve X is adjusted so as to provide the following circuit for the flow of the primary fluid:

C–$cx$–X–$xn$–N–$nv$–V1–F–E–V3–$hv$–H$x$–$xh$–X–$xc$–C

The primary fluid flowing through this circuit will absorb heat calories from the air-to-fluid heat exchanger H$x$ and hence from the air flow A$x$, FIG. 1, which is expelled through the opening O$x$. The heat thus absorbed is delivered from the primary circuit N in the fluid-to-fluid heat exchanger G and is transferred to the secondary heat exchange fluid flowing therethrough through the terminals $a$ and $b$.

The heated secondary fluid is circulated through the two secondary circuits, i.e.:

Circuit H$i$—

$a$–$ay$–Y–H$i$–$hp$–P–$pb$–$b$ and

Circuit U—

$a$–$az$–Z–$zu$–U1–$up$–P–$pb$–$b$

The heat absorbed by the secondary fluid will thus be delivered on the one hand to the in-coming air through the air-to-fluid heat exchanger H$i$ and on the other hand to the radiant heating sub-ceiling U1, U2.

The distribution of the heat delivered from the secondary fluid between the components H$i$ and U1 can be selectively adjusted by means of the by-pass valves Y and Z associated with the by-passes $yp$ and $pz$ shown in broken lines.

Air circuit FIG. 1

When operating on the heating cycle, the ventilation air i.e. the air flowing through the opening O$i$ into the chamber K$i$ and conveyed by the blower B$i$ into the space TU, FIG. 3, intermediate the upper ceiling and the sub-ceiling, must also be heated. This heating is partly achieved by means of the heat exchanger H$i$ and partly through mixing the in-coming air A$i$ with the room air A$r$ which passes through the compressor chamber K$c$ cooling the compressor C and the motor M.

The air flow through the compressor chamber K$c$ is obtained by adjusting the air valves D1, and D2 in the position shown in full lines in FIG. 1 in which both ends of the by-pass channel K$z$ are closed. Simultaneously the air valves D3 and D4 are likewise adjusted in their closing position as shown in full lines in FIG. 1.

The room air A$r$ flowing into the room air chamber K$r$ through the return air channel air channel R will flow through the channel K$y$ and the compressor chamber K$c$ into the air intake chamber K$i$ and will be mixed in this chamber with the fresh air A$i$ entering through the opening O$i$. The mixture of fresh air and room air will pass through the heat exchanger H$i$ and flows into the space TU between the upper ceiling T and the sub-ceiling U through the opening O$u$ in the wall W$u$.

As shown in FIG. 3, the mixed air will flow through openings U3 in the sub-ceiling and will enter the room subjacent the sub-ceiling U as ventilation air.

This air flow will cause a draughtless and uniform ventilation, and the room air will subsequently flow through the return channel R into the room air chamber K$r$. From this chamber one portion of the room air A$r$ will flow through the damper S$r$ into the expulsion chamber K$x$ and will be conveyed by the blower B$x$ through the heat exchanger H$x$ and the opening O$x$ into the atmosphere. Simultaneously another air current A$c$ derived from the atmosphere will flow through the opening O$c$ in the outer wall W$x$ and the channel K$cx$ into the chamber K$x$ and after delivering heat to the heat exchanger H$x$ will be expelled through the opening O$x$.

B. COOLING

Compressor circuit

When operating on the cooling cycle the fresh air A$i$ entering through the opening O$i$ and the pipe frame U1 of the sub-ceiling will be cooled as a consequence of the adjustment of the reversing valve X so as to form the following circuit for the primary fluid:

C–$cx$–X–$xh$–H$x$–$hv$–V2–F–E–V4–$nv$–N–$xn$–X–$xc$–C

In this circuit cooling calories will be absorbed from the heat exchanger H$x$ and transferred to the primary circuit N of the fluid-to-fluid heat exchanger G, wherein the cooling calories will be delivered to the secondary fluid. The cooled secondary fluid will flow through the two secondary circuits H$i$ and U in the same manner as explained above with reference to the heating cycle, and the fresh air flowing through the heat exchanger H$i$ and the pipe frame will thus be cooled.

Air circuit

When operating on the cooling cycle, the air valves D are adjusted in the positions shown by the thin broken lines, i.e. the positions D′1, D′2, D′3 and D′4. The room air A$r$ will now flow from the chamber K$r$ through the damper S$y$ and the channels K$y$ and K$z$ into the chamber K$i$ and the ventilation will be effected in the same manner as when operating on the heating cycle. On the other hand, the cooling of the compressor and motor K$c$ will be effected by the fresh air derived from the atmosphere through the opening O$c$. The cooling air will pass through the open valves D3 and D4 into the chamber K$x$, whence it will be expelled by the blower B$x$ through the opening O$x$ into the atmosphere.

Acoustic damping

The perforated plate elements U2 of the sub-ceiling and the base plate Q of the machinery compartment may readily be adapted for sound absorption in a manner well-known per se by providing a layer of acoustic damping material above the said plate elements. Thus, an air conditioning system according to the invention may be adapted to the combined effects of heating, cooling, ventilation and sound damping without substantially increasing the costs of manufacture or installation.

Having thus described the invention, what is claimed is:
1. A radiant heating or cooling system comprising a sub-ceiling including a plurality of fluid conducting pipes and a plurality of plate elements arranged in heat exchange relation with said pipes, means for circulating a secondary heat exchange fluid through said pipes, a heat pump sys- tem comprising a compressor circuit including a compressor, a primary air-to-fluid heat exchanger and a fluid-to-fluid heat exchanger, pipes interconnecting said compressor and heat exchangers for circulating a primary heat exchange fluid therethrough and means for evaporating said fluid in said compressor circuit and a reversing valve for reversing the direction of flow of primary heat exchange fluid through said compressor circuit, said fluid-to-fluid heat exchanger comprising a primary circuit included in said compressor circuit and a secondary circuit including pipe lines interconnecting said fluid-to-fluid heat exchanger and the pipes of the sub-ceiling for circulating the secondary heat exchange fluid therethrough in heat exchange relation with the primary heat exchange fluid flowing through the compressor circuit, wherein the secondary circuit of the fluid-to-fluid heat exchanger comprises two branches, one of which is connected with the pipes of the sub-ceiling, the other branch being connected with a secondary air-to-fluid heat exchanger, each of said branches including valve means for adjusting the flow of heat exchange fluid therethrough.

2. In a radiant heating and cooling system, a heat pump circuit including a compressor, heat exchangers and means for circulating a primary heat exchange fluid through said circuit, a fluid-to-fluid heat exchanger having a primary and a secondary circuit, said primary circuit being included in said heat pump circuit, a radiant heating or cooling panel comprising a pipe frame and a plurality of plate elements heat conductively associated with said pipe frame, pipe lines connecting said pipe frame with the secondary circuit of the fluid-to-fluid heat exchanger and means for circulating a secondary heat exchange fluid through said secondary circuit in heat exchange relation with the primary fluid flowing through the heat pump circuit including the primary circuit of the fluid-to-fluid heat exchanger, a primary air-to-fluid heat exchanger included in the heat pump circuit and adapted to transfer heat energy from the atmosphere to the primary fluid flowing through the said circuit, a reversing valve included in the heat pump circuit between the air-to-fluid and the fluid-to-fluid heat exchangers, a pipe connecting one branch of said reversing valve to the pressure side of the compressor, another pipe connecting another branch of said reversing valve to the suction side of the compressor, a pair of unidirectional valves arranged for passage of fluid in opposite directions and connected to one terminal of the primary circuit of the fluid-to-fluid heat exchanger, a second pair of unidirectional valves arranged in the same manner and connected to one terminal of the primary air-to-fluid heat exchanger in the heat pump circuit, a pipe interconnecting one unidirectional valve in one of said pairs and one opposite unidirectional valve in the other pair, a fluid container connected with the two remaining unidirectional valves in said pairs, an expansion valve inserted between said container and the pipe interconnecting one unidirectional valve in each of said pairs, a secondary air-to-fluid heat exchanger inserted in the secondary circuit of the fluid-to-fluid heat exchanger, and valve means for arbitrarily adjusting the flow of fluid in the secondary circuit through the secondary air-to-fluid heat exchanger and the pipe frame of the radiant heating or cooling panel.

3. In an air-conditioning system for combined radiant heating, cooling and ventilation of a room defined by an upper ceiling, an outer wall and a pair of inner walls, a sub-ceiling subjacent the upper ceiling and comprising a pipe frame including a system of parallel pipes, plate elements heat conductively associated therewith and apertures in the sub-ceiling for supplying ventilation air to the room below the sub-ceiling, a combined heat pump and ventilation system enclosed in a compartment adjacent the sub-ceiling and defined by a base plate subjacent the upper ceiling, the outer wall and the inner walls and a side wall intermediate the outer wall and the sub-ceiling, said compartment comprising partitions dividing the cavity of the compartment into the following chambers and channels:

an air-intake chamber at one end of the compartment comprising a blower and a secondary air-to-fluid heat exchanger, said chamber communicating with the atmosphere through an opening in the outer wall and with the room through an opening in the side wall adjacent said heat exchanger, an air-expulsion chamber comprising a blower and a primary air-to-fluid heat exchanger, said chamber communicating with the atmosphere through an opening in the outer wall adjacent said heat exchanger, a compressor chamber intermediate said air-intake and air-expulsion chambers and comprising a compressor unit, a by-pass channel intermediate said compressor chamber and the outer wall and communicating with the air-expulsion chamber and with an opening in the outer wall, a room air-circulation chamber at the other end of the compartment comprising an opening in the bottom plate thereof communicating with an air-duct for conveying room air to said chamber, a by-pass channel intermediate the compressor chamber and the side wall of the compartment, a by-pass channel intermediate the air-expulsion chamber and the side wall of the compartment, the partitions between said chambers and channels being provided with apertures and air-valves for interconnecting them as follows:

an air-valve at either end of the by-pass channel between the compressor chamber and the side wall and arranged for closing said channel in one position and for closing the compressor chamber in the other position of said valves, an air-valve at one end of the by-pass channel intermediate the outer wall and the compressor chamber and adjacent the opening in the outer wall communicating with said by-pass channel, said air-valve being arranged for alternatively closing said by-pass channel and the compressor chamber, an air-valve in the partition between the compressor chamber and the air-expulsion chamber, an aperture in the partition between the air-expulsion chamber and the room air-circulation chamber, and a damper in said aperture for adjusting the air-flow therethrough, a damper at one end of the by-pass channel intermediate the air-expulsion chamber and the side wall for adjusting the air-flow through said channel, a fluid-to-fluid heat exchanger in said compartment providing heat exchange between a primary and secondary circuit and means for circulating heat exchange fluid and pipe lines interconnecting said components in said compartment and the pipe frame of the sub-ceiling to form:

(1) a primary circuit including the compressor, primary air-to-fluid heat exchanger and primary circuit portion of the fluid-to-fluid heat exchanger, and (2) a secondary circuit including the secondary-circuit portion of the fluid-to-fluid heat exchanger and one branch including the pipe frame of the sub-ceiling and a second branch including the secondary air-to-fluid heat exchanger.

4. An air-conditioning system comprising means defining an enclosure to be air-conditioned; means defining an air passage leading to said enclosure; means defining a first circuit including a compressor and expander and reversible means to circulate a primary heat exchange fluid in said first circuit; a second circuit; a heat exchanger for thermally interconnecting said first and second circuits; two in parallel to said circuit-interconnecting heat exchanger, one of said secondary heat exchangers being in radiator/ one of said secondary heat exchangers being in radiator-target relationship to said enclosure and the other being a convection heat exchanger located in said air passage leading to said enclosure; means to circulate a secondary heat exchange fluid through said second circuit and means to proportion distribution of the secondary heat exchange fluid between said secondary heat exchangers so as to proportion radiation and convection effects in said enclosure.

5. A system according to claim 4 in which the secondary heat exchanger in radiator/target relationship to the enclosure is a sub-ceiling comprising a pipe frame and a plurality of plate elements heat conductively associated with said pipe frame.

6. A system according to claim 4 including means defining air passages such that the air-flow entering the enclosure past the convection heat exchanger is a mixture of air drawn from the enclosure and air drawn from the atmosphere.

7. A system according to claim 4 wherein the first circuit includes a primary heat exchanger located in an air passage leading to the atmosphere.

References Cited by the Examiner
UNITED STATES PATENTS

| | | | |
|---|---|---|---|
| 1,935,281 | 11/1933 | Reed | 165—29 |
| 2,660,409 | 11/1953 | Pittenger | 156—56 |
| 2,751,198 | 6/1956 | Rapp | 165—56 |
| 2,779,171 | 1/1957 | Lindenblad | 62—324 |
| 2,800,308 | 7/1957 | Parkinson | 165—56 |
| 3,080,914 | 3/1963 | Shippee | 165—49 |
| 3,188,829 | 6/1965 | Siewert | 62—160 |

WILLIAM J. WYE, *Primary Examiner.*